United States Patent
Gray

[15] 3,667,530
[45] June 6, 1972

[54] PORTABLE TIRE BREAKER

[72] Inventor: John V. Gray, P.O. Box 217, Severy, Kans. 67137

[22] Filed: Oct. 9, 1970

[21] Appl. No.: 83,261

[52] U.S. Cl. .......................................... 157/1.26
[51] Int. Cl. ........................................ B60c 25/06
[58] Field of Search ....................... 157/1.26, 1.28

[56] References Cited

UNITED STATES PATENTS

| | | | |
|---|---|---|---|
| 2,784,777 | 3/1957 | Ammann | 157/1.26 |
| 2,506,007 | 5/1950 | Winstead | 157/1.28 |
| 2,281,476 | 4/1942 | Casey | 157/1.28 |
| 2,582,869 | 1/1952 | Honeycutt | 157/1.26 |
| 2,925,124 | 2/1960 | Harrod | 157/1.26 |

Primary Examiner—Granville Y. Custer, Jr.
Attorney—Walter S. Pawl

[57] ABSTRACT

This tool can be easily made from mostly standard parts, such as standard pipe for the cylindrical arm having an arched member to straddle a tire of any size fixed to one end of the pipe and a piston in said pipe having a rod extending from the inner end of said pipe with a wedge head on its outer end for pressing against the bead edge of a tire, while the outer end of the arched member is purchased against the opposite edge of the wheel rim, and a hand pump unit having a threaded port connected to the outer end of the cylindrical arm for pumping fluid under pressure against said piston to press said wedge head between the bead edge of the tire and the rim edge of the wheel for breaking the tire off the side of the rim without necessarily removing the wheel from its axle. The tool can be readily handled by the cylindrical arm with one hand while the other hand is used for operating the hand pump. A tire iron may be used for the pump handle.

7 Claims, 4 Drawing Figures

PATENTED JUN 6 1972 3,667,530
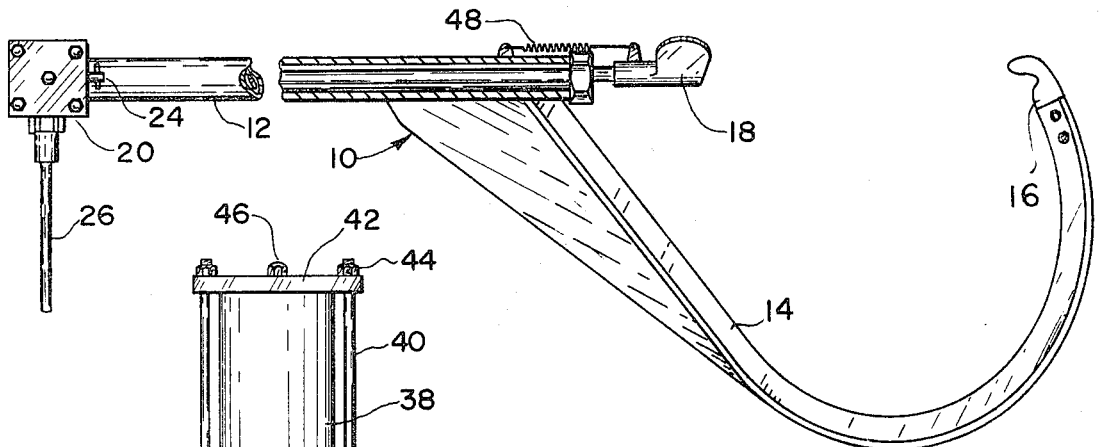
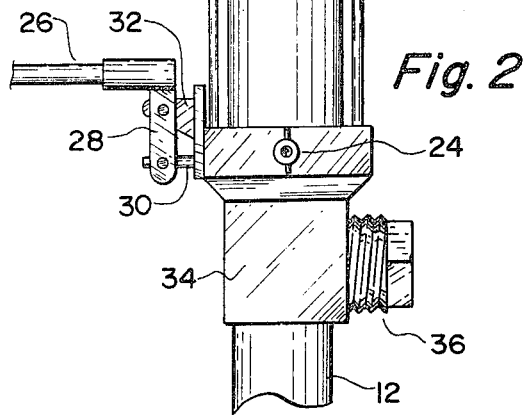
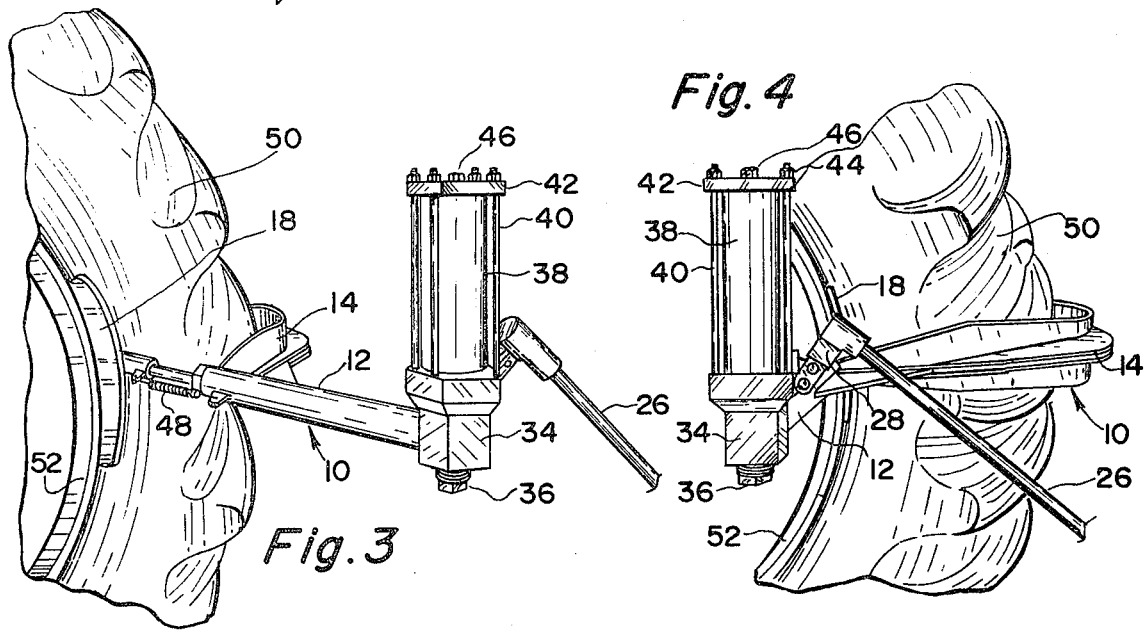
INVENTOR
JOHN V. GRAY
BY Walter S. Paul
ATTORNEY

PORTABLE TIRE BREAKER

Three of the most pertinent references found in the prior art are U.S. Pat. Nos. 2,281,476 issued to Casey, 2,506,007 to Winstead and 2,784,777 to Ammann. The Winstead disclosure appears to be the closest, but is not a portable tool in that it cannot be applied to a tire on a wheel unless the wheel, or at least the wheel rim is removed from its axle on the vehicle and placed into the arched member of the tool, which is provided with a supporting base to stand upright on the floor.

The other references show substantially portable tools, but they need a fluid pressure supply line for their operation.

Applicant found it more practical to use a hand pump to supply the fluid pressure directly to a portable tire breaker tool which can be simply made mostly of light weight standard parts, and that would be reliable and self sufficient, and could be easily dismantled for storage in a minimum space.

The object of this invention is to make a simple, reliable, self sufficient and lightweight portable tire breaker tool which could be used on tires on wheels without necessarily dismounting the wheels or their tire mounting rims.

A further object is to use a standard pipe of suitable size for the arm of a tire breaker tool and mount a piston therein with a rod extending from the inner end of said pipe and having a tire breaker head at the end of said rod, the arched member for straddling a tire being fixed at one end to said pipe and a hand pump unit fixed to the outer end of said pipe for driving said piston inwardly to press said tire breaker head against the tire bead to break it away from the edge of the wheel rim on which the tire is mounted.

A further object is to provide a hydraulic fluid reservoir on said hand pump unit to supply the fluid in a closed system, in which a pressure release valve is used in a passage by-passing the pump to return the fluid from the piston chamber in said pipe to the reservoir the piston being normally spring biased to its retracted position in said pipe.

A further object is to provide alternate threaded ports in the pump casing for connecting the pump unit in different selected relations to the outer end of said pipe and a plug for closing the unused port or ports.

A further object is to use a flattened-ended tire iron for the pump handle.

Other and more specific objects will become apparent in the following detailed description of the invention as illustrated in the accompanying drawing, wherein:

FIG. 1 is a plan view of a preferred form of the invention partly broken away to show the piston rod extending through the cylindrical arm, FIG. 2 is an elevational view of the pump unit mounted in line with the cylindrical arm of the tool when used in a vertical position, and FIGS. 3 and 4 are perspective views from different angles of the tire breaker of FIG. 1 applied to a tire on a tractor wheel.

Referring to the drawing, the specific form of the invention illustrated is a tool 10 having a hollow cylindrical arm 12 which may be a suitable length of standard pipe threaded at both ends with a cap at one end to which an arched member 14 is fixed for straddling a tire 50 which is to be freed from its wheel rim 52. The outer end of arched member 14 is provided with a notch 16 for engaging the far edge of the wheel rim, while a wedge head 18 at the end of a piston rod extending through the cap at the end of the arm is pressed against the bead edge of the tire on the near side thereof to break the tire away from the edge of the rim and push the bead entirely into the hollow dwell in the middle of the rim before prying it off the wheel over the edge of the rim.

The piston rod is pushed outwardly of the arm by hydraulic fluid pressure on the piston at the inner end of the rod, then the hand pump in the unit 20 is operated by pump handle 26 to oscillate lever 28 so as to reciprocate the pump plunger 30, the lever 28 being pivoted on bracket 32. The fluid is thus pumped from the reservoir 40 through passages in the base 34 to the piston chamber in the upper end of the pipe 12 where the fluid pressure is transmitted by the piston to the wedge head 18 against the bead edge of the tire 50 adjacent to the edge of the rim 52.

The hydraulic fluid reservoir is a hollow cylinder or pipe 40 mounted on the top of the base 34 and closed at the top by the plate 42 which is clamped down by corner bolts 38 extending from the base 34 and nuts 44. A filler plug 46 is provided in plate 42, so that the fluid may be replenished when needed. A valve 24 opens a passage by-passing the pump to release the fluid pressure against the piston and return the fluid to reservoir 40 when it is desired to withdraw the wedge head 18, which is normally biased into withdrawn position by a spring 48.

Alternative threaded ports are provided in the bottom and side(s) of the base 34 for connecting the pump unit 20 in line with the pipe 12 as shown in FIG. 2, or at right angles thereto as shown in the other figures, so that the tool can be used on a tire which is on a wheel, whether the wheel has been removed from its axle and is lying flat on the ground or remains in its vertically mounted position. The unused port or ports are closed by plugs 36.

The arched member 14 illustrated is made of two angle irons shaped to conform to the arch and their flat sides are welded together and to a bracket plate which is welded to the arm 12. This makes a strong light weight portable tool which can be readily handled by its arm with one hand somewhere near the center of gravity of the tool, while operating the pump handle with the other hand, keeping the reservoir in a substantially upright position.

Many obvious modifications instructure and etails of the parts of this tool may be made without departing from the spirit and scope of this invention.

What is claimed is:

1. A portable tool for removing a tire from a wheel rim on which it is mounted comprising
   an arched member adapted to straddle the tire, having a rim engaging outer end, a length of standard pipe forming a tubular arm for handling said tool extending from the inner end of said arched member in the opposite direction from said rim engaging outer end,
   a piston in the outer end of said pipe, having a rod extending through a guide bearing in a pipe cap screwed over the inner end of said pipe and adapted to wedge between the bead edge of said tire and the wheel rim,
   a base fitting screwed over the outer end of said pipe,
   a hand pump fixed to the outer end of said base fitting and adapted to pump fluid under pressure against said piston to jack said rod against the tire bead and loosen it from the rim,
   said base fitting being a rectangular casing with a threaded port in its bottom for an in-line connection over the end of said pipe, and another threaded port in one of its sides for a right angular connection thereto when desirable, and
   a threaded plug being used to close the unused threaded port.

2. A portable tool as defined in claim 1, and
   a tire iron adapted to serve as a removable handle for said hand pump.

3. A portable tool as defined in claim 1,
   said hand pump having a pressure relief valve for relieving the fluid pressure from said piston, and
   said rod having a spring for normally biasing it to move said piston against said fluid pressure.

4. A portable tool as defined in claim 3,
   said hand pump having a hydraulic fluid reservoir mounted over it for supplying the hand pump and for receiving the fluid from the relief valve to form a closed fluid system.

5. A portable tool as defined in claim 1,
   said base casing having an enlarged upper portion,
   a cylinder mounted over said upper portion and closed at the top by a plate held down by corner bolts extending from said base casing, to form said hydraulic reservoir.

6. A portable tool as defined in claim 5,
   a pump plunger extending from one side of said enlarged upper portion, and a lever operatively connected to said plunger and having an outwardly extending socket adapted to receive a pump handle.

7. A portable tool as defined in claim 6, said relief valve having a handle extending from another side of said enlarged upper portion.

* * * * *